Figure 1:
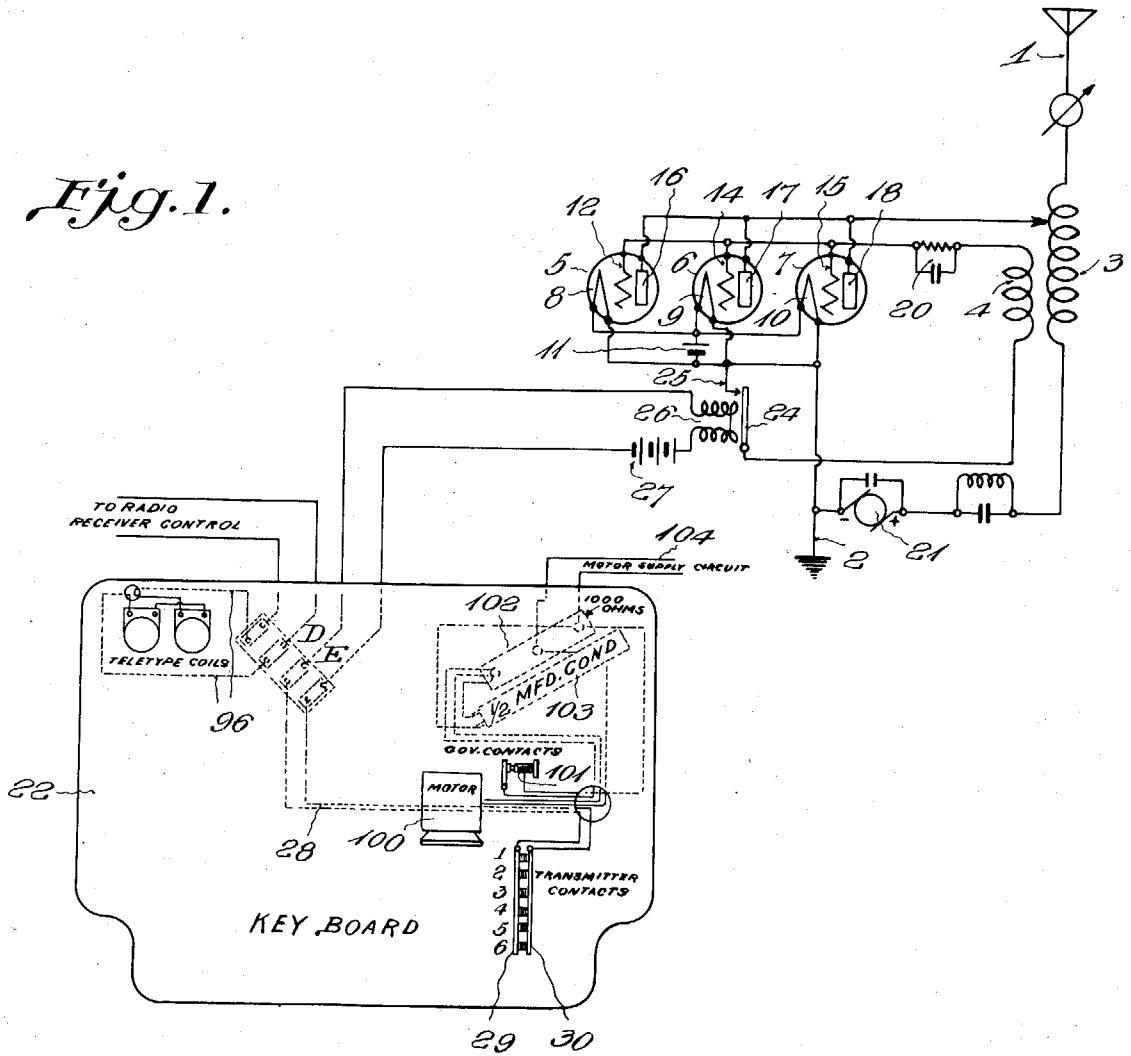

Nov. 23, 1926. Re. 16,485

J. B. BRADY

RADIO TELEGRAPH SYSTEM

Original Filed Dec. 28, 1921 3 Sheets-Sheet 1

Inventor

By John B. Brady,

William A. Strand

Attorney

Nov. 23, 1926. Re. 16,485
J. B. BRADY
RADIO TELEGRAPH SYSTEM
Original Filed Dec. 28, 1921 3 Sheets-Sheet 2
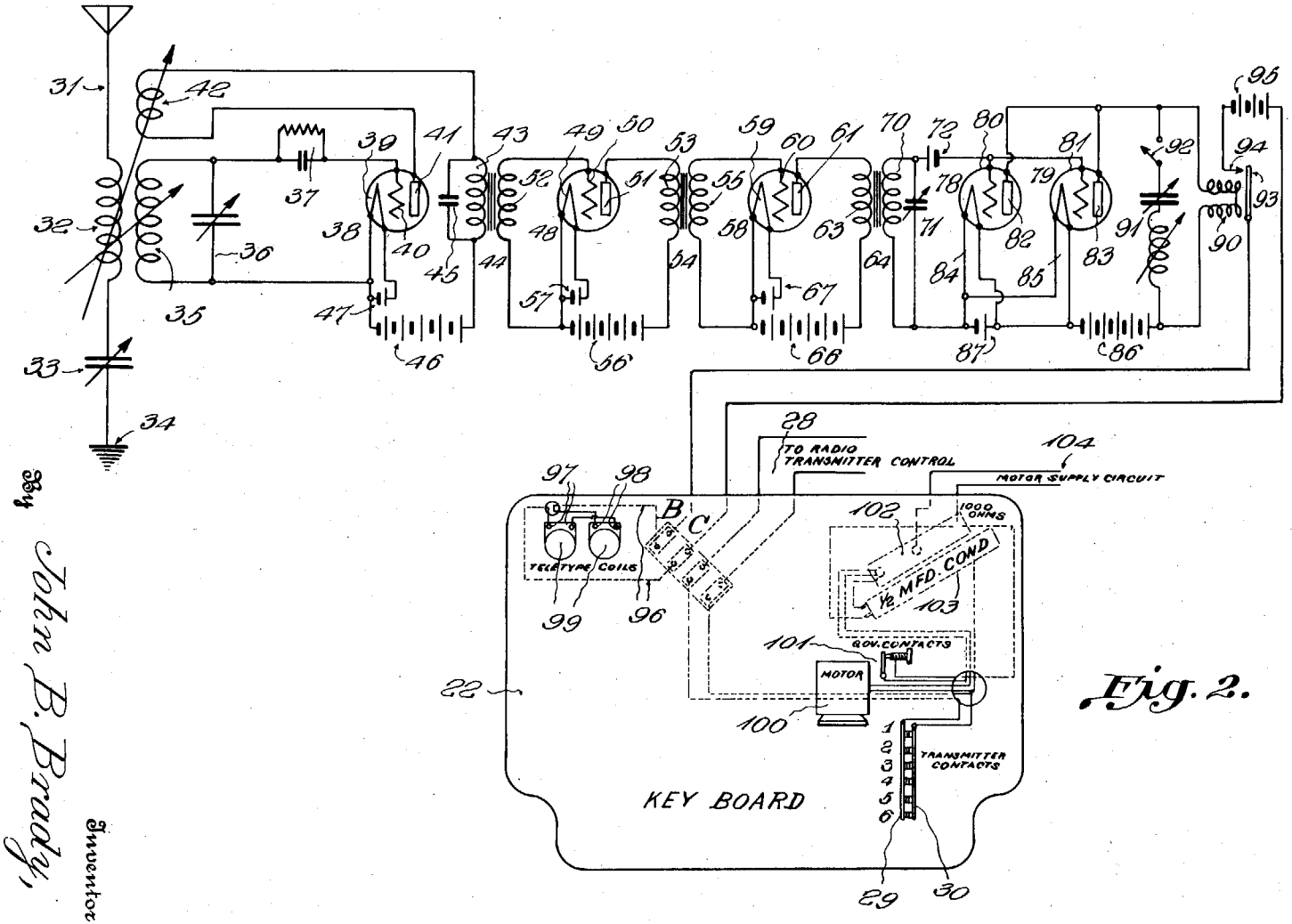
Inventor
By John B. Brady,
William A. Strauch
Attorney Nov. 23, 1926. Re. 16,485
J. B. BRADY
RADIO TELEGRAPH SYSTEM
Original Filed Dec. 28, 1921 3 Sheets-Sheet 3
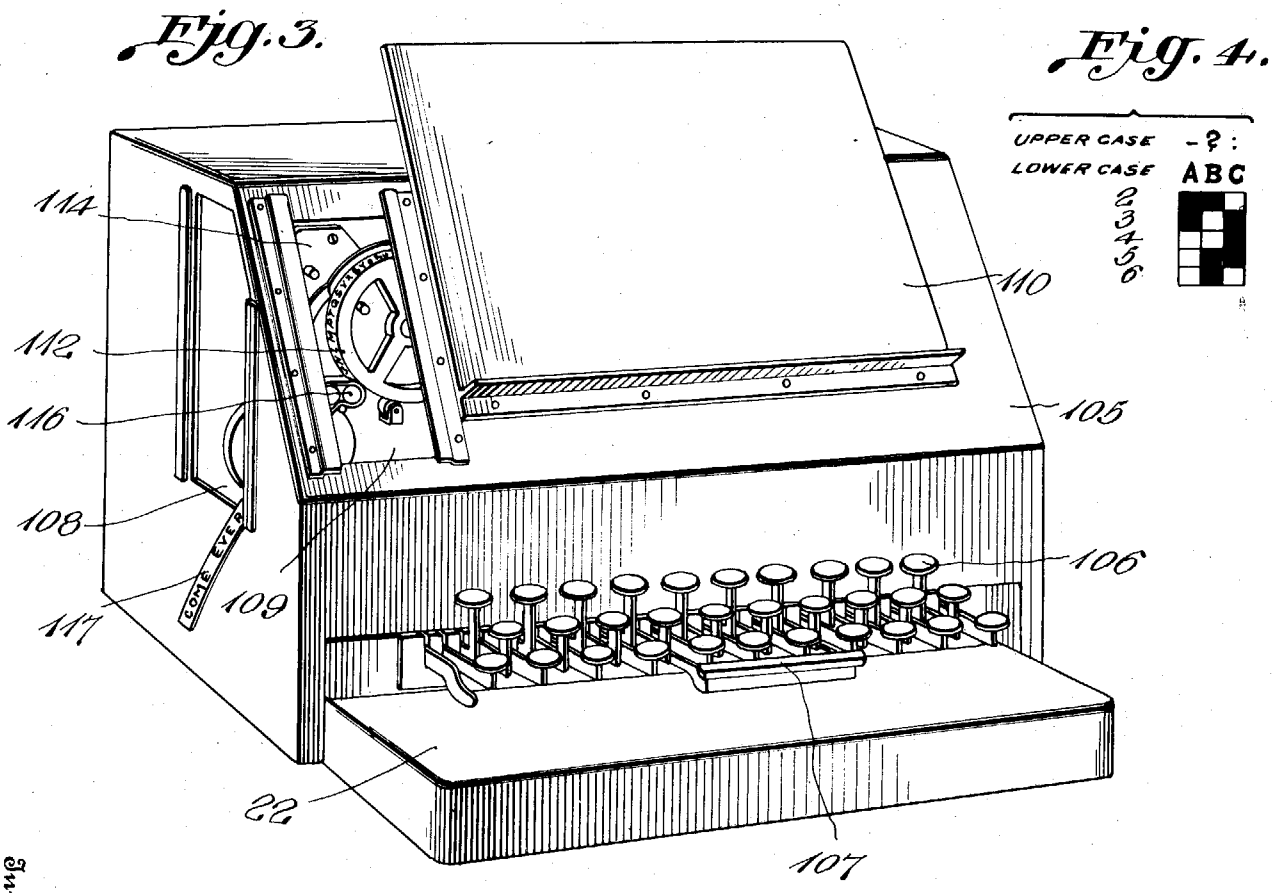
Inventor
By John B. Brady,
William A. Strauch
Attorney Reissued Nov. 23, 1926. Re. 16,485

UNITED STATES PATENT OFFICE.

JOHN B. BRADY, OF SOMERSET, MARYLAND, ASSIGNOR TO MORKRUM COMPANY, OF CHICAGO, ILLINOIS, A CORPORATION OF MAINE.

RADIO TELEGRAPH SYSTEM.

Original No. 1,485,212, dated February 26, 1924, Serial No. 525,298, filed December 28, 1921. Application for reissue filed August 30, 1926. Serial No. 132,637.

My invention relates broadly to the automatic transmission and reception of radio telegraph signals, and more particularly to a system wherein signals may be transmitted upon the operation of a letter keyboard at the transmitter and received simultaneously in printed type at the receiver.

The object of my invention is to provide a system for the control of a radio telegraph transmitter from a manually operated keyboard resembling a typewriter keyboard and to provide means at the receiver for setting down received signals in type.

A further object of my invention is to provide an impulse system of radio transmission and reception as distinguished from the present dot and dash code systems whereby to render substantially secret the messages transmitted.

A further object of the invention is to provide a transmission system which is readily controlled by an operator unskilled in the art of radio telegraphy and to provide a printer receiver which may be operated by one without knowledge of codes as at present required.

A further object of the invention is to provide means whereby code combinations may be readily changed from time to time whereby to render the system substantially secret and the code practically unbreakable.

The transmission system is adaptable for shore or ship station control and in modified form for the control of aircraft radio transmitters from which an observer can communicate to a shore or ship station by operating the lettered keys of a keyboard while the message appears simultaneously in printed type at the receiver.

The invention will be more clearly understood by reference to the accompanying drawings and the following specification in which:

Figure 1 is a wiring diagram of the transmitting apparatus; Fig. 2 is a wiring diagram of the receiving apparatus; Fig. 3 is a perspective view of the automatic transmitter and printer receiving equipment; and Fig. 4 is a diagrammatic representation of the character of impulse code employed in this system.

The invention as set forth in the particular embodiment shown in the drawings has been successfully operated between the U. S. Naval Aircraft Radio Laboratory at Anacostia, D. C., and the U. S. Naval Radio Research Laboratory, Bureau of Standards, Washington, D. C., the transmitter being controlled by a keyboard and the characters being printed at the receiver at rates of speed beyond that practicable by manual reception and translation. The system comprises broadly a transmitting unit having a source of continuous oscillations which may be an alternator, an arc, or a vacuum tube generator. The oscillations are modulated and controlled by a system of impulse transmission involving the starting and stopping of oscillations in an antenna system in combinations of impulses in accordance with an impulse code. This impulse control is preferably secured by manual operation of a lettered keyboard, the keys of which are arranged to control the operation of a set of contacts so that the latter are either closed or opened through each of a definite number of successive time intervals for each character to be transmitted. The system may utilize continuous waves, interrupted continuous waves or damped oscillations may be employed. The transmitter control is arranged for approximately 31 combinations of impulses comprising the characters to be transmitted. The energy radiated from the antenna system is practically irrecognizable on reception by ear as there is no such order of dots and dashes as at present employed in radio telegraphy, the radiations being modified to extend through one or more of a definite number of successive time intervals for each character transmitted. At the receiver either heterodyne or regenerative action is employed according to the nature of the waves being received. The energy is reduced to an audible frequency and amplified through a plurality of stages of thermionic vacuum tube amplifiers. At the final stage of amplification, a power relay is inter-connected comprising a set of parallel connected tubes having a selectively tuned input circuit, and a relay actuated thereby. The relay is adapted to open and close a battery circuit through the armature coils of an automatic teletype printer receiver or other printer receiver utilizing impulse reception.

The teletype equipment employed by way of example in this system is the invention of Charles L. Krum and Howard L. Krum, of Chicago, Illinois. This teletype apparatus is described in an application filed in the U. S. Patent Office by these inventors December 23, 1919, Serial No. 346,948 and in other pending applications, and some features of the telegraph system employed in connection with such apparatus are described in H. L. Krum Patents No. 1,286,351 dated December 3, 1918, and No. 1,434,290, dated October 31, 1922. Reference is made to these patents and to the pending applications for the details of this equipment. However, a general description is given herein.

At the transmitter a keyboard resembling the keyboard of a typewriter is provided. The individual keys of this keyboard are formed in key bars pivoted at the rear of the machine casing and arranged to be depressed by finger control. Beneath the key levers is arranged a set of five selecting bars arranged to be operated or set by the keys in different combinations. A sixth bar operated by each key controls a clutch by which a contact operating cam shaft is connected to a motor and so rotated through one revolution for each key depressed. The cam shaft is provided with a set of successively operating cams which effect and time the operation of a set of contacts, such operation being so controlled by a set of selecting fingers operated by the selector bars, that the circuit controlled by the contacts is either opened or closed through a definite number, preferably five, of successive definite time intervals for each character transmitted, and each character signal being preceded by a starting interval or impulse. That is to say, the contacts are uniformly operated at the beginning of each signal to form a starting impulse and through the remaining five intervals or units of each signal are either opened or closed to form combinations of impulses representing characters to be transmitted. In the case of a vacuum tube radio transmitter the grid circuit may be opened and closed in accordance with the sequence of the closing of the set of contacts. In the case of an arc transmitter a uniwave key may be controlled radiating impulses and suppressing impulses in succession. In the case of an alternator a magnetic amplifier may be controlled to start and suppress the radiated impulses. This operation causes the radiation of impulses of high frequency energy from an antenna system.

At the receiver these impulses are reduced to an audible frequency amplified and then actuate a power relay to energize the armature magnets of a teletype printer. The printer is controlled by a magnet having two coils which operates an armature moved in one direction by the magnet and in the opposite direction by an adjustable spring. The printer mechanism is carried by a suitable frame, the moving parts of which are operated from a motor through the medium of a start and stop clutch which is initiated in operation by the starting impulse or interval of each signal. A rotating selector actuator driven by the motor and thrown into operation by the clutch is adapted to position a set of selectors in different combinations in accordance with the movement of the armature of the controlling magnet, and which in turn is controlled by the combinations of impulses striking the receiving antenna system. The shaft carrying the selector actuator is also provided with a transfer cam which at each rotation transfers the setting of the selectors to a second set of selectors or seekers and restores the first set for the next operation.

The main shaft which carries the selector actuator also carries a combiner wheel, a notched ratchet wheel and a type wheel. The seekers cooperate with the combiner wheel to control a trip lever which in turn effects the engagement of a printing dog or arm with the notches of the ratchet wheel and the latter forces a print roller carrying a paper strip against the letter of the type wheel corresponding to the setting of the seekers, the latter and the print dog or arm being re-set or restored to normal at the end of each revolution of the main shaft by suitable cams mounted thereon. The combination of impulses striking the antenna system at the receiver thus control the operation of the printer mechanism to secure the impression of the characters represented by the signals upon a paper strip.

Figure 1 of the drawings shows the transmitting system comprising an antenna 1, inductance 3, and ground 2. A vacuum tube oscillator is shown energizing the antenna system. The oscillator comprises a set of three vacuum tubes 5, 6 and 7 having grids 12, 14, and 15 connected in parallel and plates 16, 17 and 18 connected in parallel. The filaments 8, 9 and 10 of the vacuum tubes are parallel connected and energized by battery 11. The plate circuit of the oscillators is completed through the antenna inductance 3, and source of potential 21 back to the filament side of the tubes. The grid circuit of the oscillator connects through grid leak 20 and coupling inductance 4 back to the filament connection on the oscillator. The grid circuit of the oscillator is broken by relay armature 24 and contact 25 for starting and stopping oscillations in the antenna system in accordance with the impulse code employed by the printer system. The relay armature is operated by windings 26 energized by battery 27. This relay circuit is connected to terminals DE on the teletype apparatus represented at 22. A pair of leads 28 are taken beneath this base to the teletype transmitter contacts 29 and 30. These contacts comprise a set of six circuit closing contacts in parallel which are variably operated to secure the starting and stopping of radiation from the antenna system in accordance with the order or combination of impulses of the particular character to be transmitted. The relation of the keyboard control with the operation of these contacts has been described above and it will be sufficient here to state that contact 1 forms the starting impulse of each signal while contacts 2, 3, 4, 5, and 6 are variably operated under the joint control of the cam mechanism driven by motor 100 and the key-actuated selectors so as to either open or close the circuit controlled by the contacts during each of the five selecting intervals of each signal so that corresponding combinations of impulses are transmitted. The motor 100 is maintained at a speed synchronized with the corresponding motor at the distant radio station. Motor 100 has its speed governed by make-and-break contact 101 which breaks the motor circuit across a 1000 ohm shunt 102. The excessive sparking at the governor contacts is absorbed by condenser 103. The power supply for the motor is secured through circuit 104.

Referring to Figure 2 of the drawings the radio receiver comprises an antenna system 31, a primary receiving inductance 32, series condenser 33 and ground 34. Inductively associated with the primary winding 32 is secondary winding 35 tuned by variable condenser 36. This adjustable circuit is connected through grid leak and grid condenser 37 with thermionic vacuum tube 38 having heated filament 39, grid 40, and plate 41. The plate circuit includes coupling coil 42 inductively associated with the secondary inductance 35 and including primary 43 of transformer 44 and high potential battery 46. The primary winding 43 is shunted by condenser 45. The filament 39 is energized by battery 47. The circuit is adjustable for both heterodyne and regenerative reception. The transformer 44 has its secondary winding 52 connected to the input circuit of vacuum tube amplifier 48. The amplifier comprises vacuum tube 48 having filament 49, grid 50, and plate 51 and output circuits 53 and 56. The filament 49 is heated by battery 57. The winding 53 forms the primary for transformer 54, the secondary winding 55 of which is connected to the input circuit of vacuum tube amplifier 58. The vacuum tube 58 comprises the filament 59 energized by battery 67, grid 60, and plate 61. The output circuit includes primary winding of transformer 64 and high potential battery 66. The secondary winding 70 of transformer 64 connects to the input circuit of a power amplifier.

The power amplifier herein described by way of example is the invention of F. W. Dunmore of the United States Bureau of Standards. The power relay comprises vacuum tubes 78 and 79 having their grid elements 80 and 81 parallel connected and their plate elements 82 and 83 parallel connected. The filaments 84 and 85 are energized from battery 87. A variable negative bias is placed upon the grids 80 and 81 by adjustable battery 72. The input circuit across the tubes is selectively tuned by condenser 71. The output circuit of the power relay includes armature windings 90 of a mechanical relay and high potential battery 86. The output circuit may be selectively tuned to the particular frequency of the received signals by means of circuit 91 which may be connected or disconnected from the output circuit by means of switch 92. The mechanical relay 90 has an armature 93 and co-operating contact 94 connected in circuit with battery 95 and to terminals BC upon the teletype apparatus 22. The terminals BC beneath the base of the teletype are connected through conductors 96 to the teletype armature coils 99, each coil having terminals 97 and 98 with windings series connected. These armature coils are mounted below a pivoted armature which in operation sets in motion the printer mechanism heretofore described to produce as a final result the printed character coresponding to the sequence of received impulses.

Figure 3 illustrates in perspective view the teletype apparatus developed by the Morkrum Company and used in the present radio telegraph system. The unit comprises base 22 carrying the keyboard transmitter contacts operated by the cam-shaft mechanism, the driving motor, and inter-connecting gearing for the cam-shaft and the printer mechanism. The printer mechanism is carried by a frame 114 visible through window opening 109. The printer includes the type wheel 112 and tape guide mechanism 116. The printed tape 117 is delivered through opening 108. The keyboard comprises operating keys 106 and spacer 107 resembling a typewriter keyboard. The complete apparatus is inclosed in housing 105 having a message copy support 110.

Figure 4 illustrates the character of the code employed in the present system. The characters are made up of five intervals or units of current or no current secured by the opening and closing of the transmitter circuit. The character A for example comprises two contact closures and three spaces or non-contact closures, making up the intervals 2, 3, 4, 5 and 6 upon operation of the contacts 29 and 30, of the transmitter keyboard illustrated in Figure 1. Correspondingly the characters B and C may be formed by a different order of sequence of the intervals as illustrated in Figure 4. The keyboard is provided with a shift key whereby characters may be transmitted on the upper case or the lower case as desired.

The operation of the system has probably been made clear from the specification above but may be repeated here briefly. At the transmitter the grid circuit of a vacuum tube oscillator is uniformly closed during the starting interval of each signal and is thereafter either opened or closed during the five selecting intervals of the signal to radiate from the antenna a starting impulse followed by a combination of impulses corresponding to the character to be transmitted. This is accomplished by depressing a key upon the teletype keyboard causing the operation of the cam-shaft mechanism which under control of the key-actuated selectors, operates the transmitter contacts during the starting and selecting intervals of each signal to thereby effect radiation from the antenna system during each starting interval and thereafter either effect or prevent radiation from the antenna system during the five remaining selecting intervals. At the receiver this energy is modified or reduced to an audible frequency and amplified, and operates the selective power relay to move the teletype armature in the same order of sequence as the radiations are transmitted from the distant transmitter.

The selective power tube relay operates as a rectifier of the energy which is delivered from the preceding audio frequency amplifier and the direct current pulse in the output circuit of the power tube relay is utilized to actuate the mechanical relay 90. The receiving system employs two distinct processes of rectification, that is, the frequency of the incoming signaling energy is first modified by means of the circuit of thermionic vacuum tube 38 and reduced to an audible frequency, and this audible frequency is amplified by the operation of vacuum tubes 48 and 38 and subsequently by virtue of the operation of vacuum tubes 78 and 79 the audible frequency energy is rectified for actuating the mechanical relay 90.

The armature causes the proper positioning of the type wheel and operation of the print dog to print the proper character by the printer mechanism above described giving the result of a printed character simultaneously with the depression of that same lettered key at the distant transmitter keyboard.

In the tests conducted between the United States Naval Aircraft Radio Laboratory, Anacostia, D. C., and the United States Bureau of Standards successful operations was obtained at a speed beyond that practicable by manual operation, and messages were transmitted in clear and concise order.

The system to all practical purposes is substantially secret inasmuch as the signals are not readable by aural reception. The system is capable of substantially secret operation by interchange of type wheels at the receiver with a corresponding change of designating caps upon the keys at the transmitter keyboard.

Having thus described my invention what I claim and desire to secure by Letters Patent is:

1. In a system of radio telegraphy, a transmitter comprising an electron tube oscillator, a grid control circuit therefor, means for either opening or closing said grid circuit through each of a definite number of successive definite time intervals for each character signal to thereby radiate energy in corresponding combinations of impulses and means for receiving and modifying the character of said impulses, means for amplifying said modified impulses, a rectifying relay actuated by said modified and amplified impulses and a type printer controlled by said rectifying relay whereby said modified and amplified impulses select particular characters and cause said characters to be printed.

2. In a system of radio telegraphy, a transmitter comprising an electron tube oscillator for generating continuous oscillations, means for variably modifying the radiation of said oscillations during each of a definite number of successive time intervals for each signal to thereby produce a characteristic succession of impulses, means for receiving said impulses and modifying the frequency thereof, means for amplifying said modified impulses and a selective rectifying relay operated by said modified and amplified impulses and adapted to control a circuit to an automatic printer having means controlled by said combinations of impulses for selecting characters and causing same to be printed.

3. In a system of radio telegraphy, a transmitter comprising a plurality of electron tubes for generating oscillations, means for controlling the radiation of impulses comprising a keyboard, a set of contacts and means selectively controlled by the keys of said keyboard for either opening or closing said contacts through each of a definite number of successive definite time intervals to produce a characteristically timed succession of impulses for each signal, a receiver, means for receiving and modifying the character of said impulses, means for amplifying said modified impulses, an electron tube rectifying relay actuated by said modified and amplified impulses, means for selecting the position of a type printer wheel in accordance with the series of impulses, and means for printing said character at the receiver in accordance with a character type in accordance with the succession of impulses and means cooperating with said type to print the corresponding character.

4. In a signaling system, the combination at a transmitter of a plurality of electron tubes having grid, filament and plate electrodes for generating oscillations, an oscillating circuit interconnecting said electrodes, an antenna ground system connected to said oscillating circuit, selective means comprising a plurality of keys, a set of contacts and power-actuated devices controlled by each of said keys for operating said contacts whereby said electron tube oscillator circuit, for each character signal, is either opened or closed during each of five successive time intervals to produce a characteristically timed succession of impulses, at a receiver, an electron tube apparatus for receiving the transmitted signals, an electron tube relay controlled by said apparatus and having grid, filament and plate electrodes, a circuit including said plate and a magnet, an armature operated by said magnet in accordance with the succession of impulses of each signal, and means controlled by the operations of the armature in response to each succession of impulses for selecting and printing the corresponding character.

5. A radio transmitter comprising in combination an antenna ground system, an electron tube oscillator for producing high frequency oscillations, a rotating cam shaft, cooperating contacts and means for selectively controlling the operation of said cam shaft upon said contacts to thereby either effect or arrest the radiation of oscillations from said antenna ground system during each of a definite number of successive time intervals or units for each signal.

6. In a signaling system, the combination at a transmitter of a plurality of electron tubes having grid, filament and plate electrodes for generating oscillations, an oscillating circuit interconnecting said electrodes, an antenna ground system connected to said oscillating circuit, selective means comprising a plurality of keys, a set of contacts and contact operating means controlled by the movement of each of said keys whereby said oscillations may be modulated, for each character signal, during each of five successive definite time intervals to produce a characteristically timed succession of impulses; at a receiver, an electron tube apparatus for receiving the transmitted signals, an electron tube rectifying relay controlled by said apparatus and having grid, filament and plate electrodes tuned to the tone frequency of the transmitted signals, a circuit including said plate and a magnet, an armature operated thereby in accordance with each succession of impulses and a power-actuated printing mechanism mechanically and selectively controlled by each succession of operations of said armature for printing a character in accordance with the corresponding succession of impulses.

7. In a system of radio telegraphy, a transmitter comprising a generator of sustained oscillations, means for modifying the radiation of said oscillations during each of a definite number of successive time intervals to thereby produce a characteristically timed succession of impulses for each character signal, means for receiving and modifying the character of said impulses, means for amplifying said modified impulses, rectifying means operated by said modified and amplified impulses and adjusted to correspond to the tone frequency thereof to control a circuit to an automatic printer having means controlled by each succession of impulses for selecting a character and causing same to be printed.

8. In a system of radio telegraphy, the combination at a transmitter of an electron tube oscillator and selectively controlling means therefor arranged to place said oscillator, for each character signal transmitted, in either one of two conditions during each of a definite number of successive time intervals of definite duration, to thereby produce a characteristically timed succession of impulses for each character signal; at a receiver, an electron tube apparatus for receiving and modifying the character of the transmitted signals, means for amplifying the modified signals of an electron tube rectifying relay responsive to the modified and amplified impulses of the signals, a magnet controlled by said rectifying relay, and a printer mechanism selectively controlled by said magnet for printing characters in accordance with the signals.

9. In a system of radio telegraphy, the combination at a transmitter of an electron tube oscillator and selectively controlling means therefor arranged to place said oscillator, for each character signal transmitted, in either one of two conditions during each of a definite number of successive time intervals of definite duration, to thereby produce a characteristically timed succession of impulses for each character signal; at a receiver, an electron tube apparatus for receiving and detecting the transmitted signals, means for amplifying the detected energy, an electron tube relay arranged to rectify said aforementioned energy, a magnet controlled by said relay and an automatic printer mechanism selectively controlled by said magnet for printing characters in accordance with the signals.

10. In a system of radio telegraphy, the combination at a transmitter of an electron tube oscillator and selectively controlling means therefor arranged to place said oscillator, for each character signal transmitted, in either one of two conditions during each of a definite number of successive time intervals of definite duration, to thereby produce a characteristically timed succession of impulses for each character signal, at a receiver, an electron tube apparatus for receiving and changing the frequency of the transmitted signal impulses to an audible frequency, means for amplifying said signal impulses at an audible frequency, an electron tube rectification system connected with said means, a magnet controlled by said electron tube rectification system, and a type printer mechanism selectively controlled by said magnet for printing characters in accordance with the signals.

11. In a system of radio telegraphy, the combination at a transmitter of a transmitting circuit embodying an electron tube oscillator and selectively controlling means therefor arranged to render said oscillator effective to transmit radio frequency signals comprising an impulse representing a starting condition for each character signal followed by a plurality of impulses representing selecting conditions, a receiver comprising an electron tube apparatus for receiving and modifying the character of said impulses representing the starting and selecting conditions, means for amplifying the impulses representing the modified conditions, an electron tube relay arranged to rectify the amplified and modified impulses representing the starting and selecting conditions, and a printer mechanism controlled by the rectified impulses and initiated in operation upon receipt of an impulse representing a starting condition, and controlled upon the receipt of said impulses representing said selecting conditions for printing a character in accordance with the signals.

12. In a system of radio telegraphy the combination at a transmitter of an electron tube oscillator, a transmission circuit, a set of transmitter contacts, means for actuating said transmitter contacts to impress a signal representing a starting condition upon said transmission circuit, and to impress a combination of signals representing succeeding marking and spacing conditions upon said transmission circuit; a receiver comprising an electron tube apparatus for receiving and modifying the character of the signals representing said starting, marking and spacing conditions, means for amplifying said modified signals, an electron tube relay for rectifying the amplified and modified signals, a printer controlled by the rectified signals initiated in operation upon receipt of each signal representing a starting condition for actuation by the signals representing said succeeding marking and spacing conditions for printing characters in accordance with the signals representing the marking and spacing conditions.

13. In a radio printing telegraph system, electron tube apparatus selectively controlled to transmit radio frequency signals, each made up of a signal representing a starting condition, and a combination of signals representing successive marking and spacing conditions; electron tube apparatus for receiving the signals representing said conditions and modifying the frequency thereof, separate electron tube apparatus for amplifying said signals of modified frequency, additional electron tube apparatus connected with said separate electron tube apparatus for rectifying the amplified signals of modified frequency, and a printing telegraph receiver initiated in operation in response to the signal representing the starting condition, selectively controlled by the signals representing the marking and spacing conditions of each amplified signal of modified frequency, and arrested in operation after the reception of each signal.

JOHN B. BRADY.